US005558675A

United States Patent [19]

Lauton

[11] Patent Number: 5,558,675

[45] Date of Patent: Sep. 24, 1996

[54] PROCESS FOR AFTERTREATING TANNED LEATHER AND PELTS

[75] Inventor: Alain Lauton, Saint-Louis, France

[73] Assignee: Ciba-Geigy Corporation, Tarrytown, N.Y.

[21] Appl. No.: 300,875

[22] Filed: Sep. 6, 1994

Related U.S. Application Data

[63] Continuation of Ser. No. 73,216, Jun. 4, 1993, abandoned.

[30] Foreign Application Priority Data

Jun. 9, 1992 [CH] Switzerland ............................ 1836/92

[51] Int. Cl.$^6$ ............................ C14C 9/00; C08F 122/06

[52] U.S. Cl. ............................ 8/94.21; 8/94.22; 8/94.23; 252/8.57; 525/327.7; 525/327.6; 525/327.8

[58] Field of Search .................................... 8/94.2, 94.21, 8/94.22, 94.23; 252/8.57; 525/327.7, 327.6, 327.8

[56] References Cited

U.S. PATENT DOCUMENTS

| | | | |
|---|---|---|---|
| 3,919,258 | 11/1975 | Richardson et al. | 549/252 |
| 4,018,702 | 4/1977 | Boffardi et al. | 252/389 R |
| 4,086,177 | 4/1978 | Kubitschek et al. | 252/99 |
| 4,196,271 | 4/1980 | Yamada et al. | 525/242 |
| 4,734,204 | 3/1988 | Lamb | 525/384 |
| 5,130,369 | 7/1992 | Hughes et al. | 524/846 |

FOREIGN PATENT DOCUMENTS

| | | |
|---|---|---|
| 0412389 | 2/1991 | European Pat. Off. . |
| 0418661 | 3/1991 | European Pat. Off. . |
| 9102094 | 2/1991 | WIPO . |

OTHER PUBLICATIONS

The Random House College Dictionary, p. 68, (1973) (month unknown).

The Random House College Dictionary, p. 763, (1973) (month unknown).

WPI Abstract of EP 418661, Mar. 27, 1991.

WPI Abstract of EP 412389, Feb. 13, 1991.

*Primary Examiner*—Prince Willis, Jr.
*Assistant Examiner*—Alan D. Diamond
*Attorney, Agent, or Firm*—Kevin T. Mansfield

[57] ABSTRACT

A process for aftertreating tanned leather and pelts to impart a very soft and supple handle and good fullness to them, which comprises subjecting the leather or pelts to an aftertreatment with a polymer which is obtainable by (a) polymerising a monoethylenically unsaturated dicarboxylic anhydride of 4 to 8 carbon atoms or a mixture of said dicarboxylic anhydrides, and (b) thereafter partially esterifying and/or amidating the polymer with ($b_1$) a $C_1$-$C_{30}$alcohol and/or a primary or secondary amine and/or ($b_2$) the reaction product of ($\alpha$) an unsaturated or saturated $C_1$-$C_{30}$fatty alcohol, a $C_8$-$C_{22}$fatty acid, a $C_8$-$C_{22}$fatty amine or a $C_8$-$C_{22}$fatty amide and ($\beta$) ethylene oxide and/or propylene oxide in the molar ratio 1:2 to 1:20, and, optionally, hydrolysing the anhydride groups of the homopolymer with an aqueous base.

15 Claims, No Drawings

PROCESS FOR AFTERTREATING TANNED LEATHER AND PELTS

This application is a continuation, of application Ser. No. 08/073,216 filed on Jun. 4, 1993 now abandoned.

The present invention relates to a process for aftertreating tanned leather and pelts, to formulations for carrying out said process, to a process for the preparation of said formulations, and to the leather or pelts aftertreated by the process of the invention.

The novel process for aftertreating tanned leather and pelts comprises subjecting said leather or pelts to an aftertreatment with a polymer which is obtainable by (a) polymerising a monoethylenically unsaturated dicarboxylic anhydride of 4 to 8 carbon atoms or a mixture of said dicarboxylic anhydrides, and (b) thereafter partially esterifying and/or amidating said polymer with a ($b_1$) $C_1$-$C_{30}$alcohol and/or a primary or secondary amine and/or ($b_2$) the reaction product of an (α) unsaturated or saturated $C_1$-$C_{30}$fatty alcohol, a $C_8$-$C_{22}$fatty acid, a $C_8$-$C_{22}$fatty amine or a $C_8$-$C_{22}$fatty amide and (β) ethylene oxide and/or propylene oxide in the molar ratio 1:2 to 1:20, and, in an optional additional step, hydrolysing the anhydride groups of the homopolymer with an aqueous base.

A preferred embodiment of the invention comprises using a polymer which is obtainable by (a) polymerising a monoethylenically unsaturated dicarboxylic anhydride of 4 to 8 carbon atoms or a mixture of said dicarboxylic anhydrides, and (b) thereafter partially esterifying and/or amidating said polymer with the reaction product of (α) an unsaturated or saturated $C_1$-$C_{30}$fatty alcohol, a $C_8$-$C_{22}$fatty acid, a $C_8$-$C_{22}$-fatty amine or a $C_8$-$C_{22}$fatty amide and (β) ethylene oxide and/or propylene oxide in the molar ratio 1:2 to 1:20, and subsequently hydrolysing the anhydride groups of the homopolymer with an aqueous base.

The polymers of this invention are novel. The invention also relates to the novel polymers, especially within the scope of the above preferred embodiment.

Suitable monoethylenically unsaturated dicarboxylic anhydrides are typically maleic anhydride, citraconic anhydride, methylenemalonic anhydride and mixtures of these compounds with one another. Among these anhydrides, it is preferred to use maleic anhydride.

$C_1$-$C_{30}$Alcohols suitable for use as component (b1) are typically methanol, ethanol, n-propanol, isopropanol, n-butanol, isobutanol, tert-butanol, pentanol, cyclohexanol, n-hexanol, enanthol, n-octanol, 2-ethylhexanol, pelargonol, decanol, dodecanol, myristyl alcohol, cetyl alcohol, stearyl alcohol, arachidyl alcohol, behenyl alcohol, ceryl alcohol, cerotyl alcohol, myricyl alcohol, $C_9$-$C_{11}$oxalcohol, tridecyl alcohol, isotridecanol or mixtures of linear primary alcohols (®Alfols) of 8 to 18 carbon atoms. Typical representatives of these Alfols are Alfol (8–10), Alfol (9–11), Alfol (10-14), Alfol (12-13) or Alfol (16–18).

It is preferred to use a mixture of cetyl/oleyl alcohol as component ($b_1$).

Preferred compounds for the optional partial amidation with amines are ammonia, mono or di-$C_1$-$C_5$alkylamine, phenyl-$C_1$-$C_5$alkylamine, mono- or di-$C_5$-Ccycloalkylamine or morpholine.

Typical examples of the $C_1$-$C_5$alkylamines used are monomethylamine, dimethylamine, monoethylamine, diethylamine, mono-n-propylamine, di-n-propylamine, monoisopropylamine, diisopropylamine, mono-n-butylamine, di-n-butylamine, mono-se ylamine, di-sec-butylamine, mono-tert-butylamine, di-tert-butylamine, monoamylamine, diamylamine, monoisoamylamine or diisoamylamine. Representative examples of the $C_5$-$C_7$cycloalkylamines are monocyclopentylamine, dicyclopentylamine, monocyclohexylamine, dicyclohexylamine, monocycloheptylamine and dicycloheptylamine.

Ammonia and morpholine are especially preferred.

Unsaturated or saturated $C_8$-$C_{22}$fatty acids which may be suitably used as component (α) are caprylic acid, capric acid, lauric acid, myristic acid, palmitic acid, stearic acid, arachinic acid, behenic acid, oleic acid, linoleic acid, linolenic acid, arachidonic acid or coconut fatty acid and decenoic acid, dodecenoic, tetradecenoic acid, hexadecenoic acid, or ricinolic acid.

Exemplary of the adduct of a fatty acid and and alkylene oxide is the polyadduct of 2 to 15 mol of ethylene oxide and 1 mol of a $C_8$-$C_{22}$fatty acid.

Preferred adducts are also reaction products of fatty amines and ethylene oxide or propylene oxide, conveniently fatty acid alkanolamides containing 8 to 22 carbon atoms in the fatty acid moeity and 2 to 18 carbon atoms in the alkanol moiety. These compounds are e.g. fatty acid/alkanolamine reaction products which are prepared from $C_8$-$C_{22}$fatty acids, preferably $C_8$-$C_{18}$fatty acids and $C_2$-$C_6$alkanolamines such as ethanolamine, diethanolamine, isopropanolamine or diisopropanolamine. Diethanolamine is preferred. $C_8$-$C_{18}$Fatty acid diethanolamides are especially preferred. Preferred examples of such reaction products are cocosyl diethanolamide, as well as lauroyl or stearoyl diethanolamide.

Preferred compounds suitable for use as component (α) are $C_8$-$C_{22}$fatty acids.

Aqueous bases for the partial neutralisation and hydrolysis are preferably solutions of NaOH or KOH (aqueous sodium or potassium hydroxide), and also aqueous solutions of amines such as ammonia.

The polymers used for the novel process are those in which the degree of esterification and/or amidation is e.g. 5 to 40% molar, preferably 25 to 35% molar, based on the amounts of monomers.

The novel process is suitable for aftertreating all conventionally tanned leather skins, preferably skins tanned with mineral tanning agents such as chromium(III) salts. These skins are normally neutralised before the aftertreatment. They may already be dyed before the aftertreatment; but dyeing can also be carried out after the novel aftertreatment.

The tanned and dyed or undyed skins are subjected to an aftertreatment with the aqueous polymer solution conveniently in an aqueous liquor which is obtainable by diluting the polymer solution with water in the pH range from 4 to 10, preferably from 5 to 8, and in the temperature from 20° to 50°C., preferably from 30° to 50°C., over a period of 0.1 to 5, preferably 0.2 to 2 hours. This aftertreatment is conveniently effected by stuffing in a vat. The required amount of polymer solution, based on the shaved weight of the leather or wet weight of the pelts, is 0.1 to 30% by weight, preferably 1 to 20% by weight. The liquor to goods ratio, i.e. the percentage weight ratio of the aftertreatment liquor to the goods, based on the shaved weight of the leather or wet weight of the pelts, is normally 10 to 1000%, preferably 30 to 150%, and, in the case of pelts, 50 to 500%.

After the aftertreatment with the above described aqueous liquor, the pH of the liquor is adjusted by the addition of an acid, preferably an organic acid such as formic acid, to pH 3–5, preferably 3.5–4, and the leather is finished in conventional manner.

The leather or pelts aftertreated by the process of this invention have good fullness and an extremely supple handle.

The invention also relates to an aqueous aftertreatment formulation obtainable by (a) polymerising a monoethylenically unsaturated dicarboxylic anhydride of 4 to 8 carbon atoms or a mixture of said dicarboxylic anhydrides, and (b) thereafter partially esterifying and/or amidating said polymer with a ($b_1$) $C_1$-$C_{30}$alcohol and/or a primary or secondary amine and/or ($b_2$) the reaction product of an (α) unsaturated or saturated $C_1$-$C_{30}$fatty alcohol, a $C_8$-$C_{22}$fatty acid, a $C_8$-$C_{22}$fatty amine or a $C_8$-$C_{22}$fatty amide and (β) ethylene oxide and/or propylene oxide in the molar ratio 1:2 to 1:20, and, in an optional additional step, hydrolysing the anhydride groups of the homopolymer with an aqueous base.

Preferred aqueous aftertreatment formulations are obtainable by (a) polymerising a monoethylenically unsaturated dicarboxylic anhydride of 4 to 8 carbon atoms or a mixture of said dicarboxylic anhydrides, and (b) thereafter partially esterifying and/or amidating said polymer with the reaction product of (α) an unsaturated-or saturated $C_1$-$C_{30}$fatty alcohol, a $C_8$-$C_{22}$fatty acid, a $C_8$-$C_{22}$-fatty amine or a $C_8C_{22}$fatty amide and (β) ethylene oxide and/or propylene oxide in the molar ratio 1:2 to 1:20, and subsequently hydrolysing the anhydride groups of the homopolymer with an aqueous base.

The invention further relates to polymers which are obtainable by (a) polymerising a monoethylenically unsaturated dicarboxylic anhydride of 4 to 8 carbon atoms or a mixture of said dicarboxylic anhydrides, and (b) thereafter partially esterifying and/or amidating said polymer with a ($b_1$) $C_1$-$C_{30}$alcohol and/or a primary or secondary amine and/or ($b_2$) the reaction product of an (α) unsaturated or saturated $C_1$-$C_{30}$fatty alcohol, a $C_8$-$C_{22}$fatty acid, a $C_8$-$C_{22}$fatty amine or a $C_8$-$C_{22}$fatty amide and (β) ethylene oxide and/or propylene oxide in the molar ratio 1:2 to 1:20, and, in an optional additional step, hydrolysing the anhydride groups of the homopolymer with an aqueous base.

The polymerisation of the ethylenically unsaturated anhydrides is carried out by per se known batchwise or continuous processes such as mass, suspension, precipitation and solvent polymerisation.

The starting monomeric ethylenically unsaturated dicarboxylic anhydrides are preferably used as homogeneous compounds in technical purity. However, mixtures of different dicarboxylic anhydrides can also be used so as to form copolymers. The homopolymers are preferred.

The polymerisation of the anhydrides is carried out conveniently in the temperature range from 80°to 300° C., preferably from 120°to 200° C. The lowest polymerisation temperature to be chosen is preferably about at least 20° C above the glass transition temperature of the resultant polymer. The polymerisation conditions will be chosen in accordance with the intended molecular weight of the polymers. Polymerisation at higher temperature gives polymers of low molecular weight, whereas polymers of high molecular weight are formed at low polymerisation temperatures. With respect to the novel composition, the conditions are so chosen that polymers having molar masses of 500 to 30 000 g per mole, preferably 500 to 2000 g per mole, are formed.

One simple method of preparing the polymers is precipitation polymerisation. This method consists in using a solvent in which the monomer is soluble and the polymer formed is insoluble and precipitates. Such solvents are typically aromatic compounds, preferably toluene, xylene, benzene or cumene and mixtures thereof.

The preferred method is solvent polymerisation. It is carried out in solvents in which not only the monomers but also the polymers formed are soluble. Suitable for this method are all solvents that meet these conditions and are inert to the acid anhydrides. Such solvents are typically acetone, methyl ethyl ketone, diethyl ketone, methyl isobutyl ketone, ethyl acetate, butyl acetate as well as aliphatic hydrocarbons such as n-octane, isooctane, cyclohexane or methyl cyclohexane.

The polymerisation is carried out in all methods using compounds which decompose to radicals, typically peroxides, hydroperoxides, redox initiators and azo compounds. Suitable polymerisation initiators include acetyl cyclohexanesulfonylperoxide, diacetyl peroxydicarbonate, bis(2-ethylhexyl) peroxydicarbonate, tert-butyl perneodecanoate, 2,2'-azobis(4-methoxy-2,4-dimethylvalerionitrile), tert-butyl permaleate, 2,2'-azobis(isobutyronitrile), bis(tert-butylperoxy)cyclohexane, tert-butyl peroxyisopropylcarbonate, tert-butylperacetate, di-tert-butyl peroxide, di-tert-amyl peroxide, cumene hydroperoxide and tert-butyl hydroperoxide. The initiators can be used alone or in admixture with one another. The polymerisation initiators are preferably used in amounts of 5 to 40%, based on the respective amount of monomeric anhydride.

All the above polymerisation methods are carried out in an inert atmosphere, preferably excluding oxygen, most preferably in a stream of inert gas, typically nitrogen or argon. The customary apparatus is used for all polymerisation reactions, conveniently autoclaves and reactors equipped with e.g. anchor, paddle, impeller or multistage impulse counter—current stirrers.

The polymers obtainable in this manner are subsequently partially esterified and hydrolysed in a following reaction step such that the anhydride groups are convened into carboxyl groups. It is also possible initially to hydrolyse the polymers containing anhydride groups so that all anhydride groups are obtained as carboxyl groups and then to carry out the esterification by known methods. The preferred mode, however, is that in which the carboxylic anhydride groups of the polymer are first partially esterified.

The partial esterification can be carried out in the presence of solvents that are inert to the anhydride groups and which dissolve or cause both the starting materials as well as the esterified copolymers to swell. Typical examples of such solvents are toluene, xylene, ethylene benzene, aliphatic hydrocarbons and ketones such as acetone and methyl ethyl ketone. The ratios of the reactants are so chosen that only partial esterification of the anhydride groups takes place. Based on the hydrolysed partially esterified polymer, 5 to 75%, preferably 5 to 50%, of the carboxyl groups are esterified. The esterification itself is normally carried out at elevated temperature, conveniently in the range from 50°to 200° C., preferably from 80°to 150° C., in the presence of customary esterification catalysts. p-Toluenesulfonic acid is particularly suitable. The esterification reaction is terminated after about 0.5 to 20 hours, preferably after 1 to 10 hours. After the partial esterification, the solvents are removed from the reaction mixture, e.g. by distillation, under normal or reduced pressure, and the residual esterified polymers are dissolved in water by addion of alkali, whereupon the anhydride groups still present in the polymer are hydrolysed. Suitable alkalies include aqueous sodium hydroxide, aqueous potassium hydroxide, ammonia, amines and alkanolamines.

The pH of the aqueous partially esterified polymer solution so obtained is in the range from 4 to 10, preferably from 6 to 8.

The following Examples will serve to illustrate the invention. Unless otherwise indicated, percentages are by weight.

EXAMPLE 1

240 g of maleic anhydride and 240 g of technical xylene are charged to a polymerisation reactor equipped with stirrer, condenser, nitrogen inlet and outlet and metering device, and heated to c. 140° C. to the boil. To the gently boiling solution are added 80 g of di-tert-butyl peroxide over 2 hours and, after addition of the initiator, the reaction mixture is refluxed, with stirring, for 2 hours, whereupon two phases form. The polymer so obtained with a molar mass of c. 4000 g per mole is then partially esterified with 230 g of a mixture of cetyl/oleyl alcohol in the presence of 1 g of p-toluenesulfonic acid at 130° C. for 2 hours, with stirring, while removing the residual xylene by distillation under reduced pressure.

The reaction mixture is cooled to 100° C. and, by simultaneous addition of 384 ml of water and 180 g of a 30% aqueous solution of sodium hydroxide, processed to a stable yellowish emulsion having a solids content of c. 55% and a pH of 6.8. About 45% molar of the carboxyl groups formed from the anhydride groups have been esterified and c. 55% have been neutralised.

EXAMPLE 2

560 g of the polymer prepared in Example 1 in xylene are partially esterified with 200 g of a mixture of cetyl/oleyl alcohol and 200 g of a polyadduct of 6 mol of ethylene oxide with 1 mol of a $C_{16}$-$C_{18}$oxalcohol in the presence of 2 g of p-toluenesulfonic acid for 3 hours at 130° C., while removing the residual xylene by distillation. The reaction mixture is cooled to 100° C. and, by simultaneous addition of 800 ml of water and 106 g of a 30% aqueous solution of sodium hydroxide, processed to a pale yellowish, low viscosity emulsion having a solids content of c. 40% and a pH of 6.8.

EXAMPLE 3

With stirring, 560 g of the polymer prepared in Example 1 in xylene are partially esterified with 192 g of a mixture of cetyl/oleyl alcohol in the presence of 1 g of p-toluenesulfonic acid for 2 hours, while removing the residual xylene by distillation. Then 161 g of morpholine are added over half an hour and the reaction mixture is heated, with stirring, within 2 hours to 130° C., in the course of which time further anhydride groups of the copolymer still present are converted into monoamide groups. The reaction mixture is cooled to 80° C. and processed to an aqueous solution by simultaneous addition of 257 ml of water and 115 g of a 30% aqueous solution of sodium hydroxide. The pale brown, low viscosity solution so obtained has a solids content of c. 60% and a pH of 7.0.

EXAMPLE 4

The process described in Example 1 is repeated, but replacing 230 g of the cetyl/oleyl alcohol mixture with 115 g of octanol, to give a dispersion which is viscous at room temperature and has a solids content of c. 45%.

EXAMPLE 5

The process described in Example 1 is repeated, but using instead of 230 g of the cetyl/oleyl alcohol 1505 g of the cetyl/oleyl alcohol and 92 g of laurylamine, to give a dispersion which is viscous at room temperature and has a solids content of c. 55%.

EXAMPLE 6

The process described in Example 1 is repeated, but replacing 230 g of the mixture of cetyl/oleyl alcohol with 250 g of the polyadduct of 8 tool of ethylene oxide with 1 mol of stearic acid, to give a dispersion which is viscous at room temperature and has a solids content of c. 52%.

EXAMPLE 7

The process described in Example 1 is repeated, but replacing 230 g of the mixture of cetyl/oleyl alcohol with 240 g of the polyadduct of 4 tool of ethylene oxide with 1 mol of oleylamine, to give a dispersion which is viscous at room temperature and has a solids content of c. 50%.

EXAMPLE 8

The process described in Example 1 is repeated, but replacing 230 g of the mixture of cetyl/oleyl alcohol with 230 g of the polyadduct of 6 tool of ethylene oxide with 1 mol of lauramide, to give a dispersion which is viscous at room temperature and has a solids content of c. 49%.

EXAMPLE 9

Chrome-tanned cow-hide neutralised to pH 5.2 and having a shaved thickness of 1.8 mm is dyed in conventional manner with 1%, based on the weight of the leather, of the dye of formula

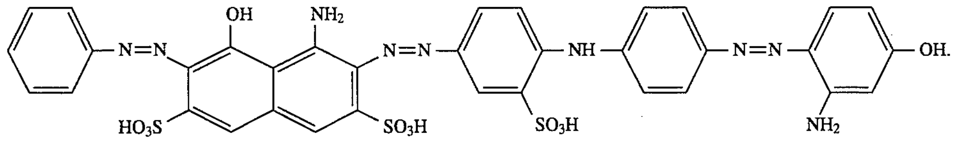

Afterwards the leather is subjected to an aftertreatment with 8% of the product prepared according to Example 1, based on the shaved weight. The overall liquor to goods ratio is 100%. The liquor is then adjusted with formic acid to pH 3.8.

The leather obtained is very soft, has a supple handle and is dyed in a brilliant level shade.

In the fogging test according to DIN 75 201, process B (gravimetric test), the aftertreated leather exhibits less fogging deposit than leather treated with a conventional fatliquoring agent (fish oil derivative).

What is claimed is:

1. A process for the treatment of tanned leather and pelts in order to improve their fullness and handle, which comprises contacting said leather or pelts in an aqueous liquor with an effective amount of a polymer which is obtained by (a) polymerising a monoethylenically unsaturated dicarboxylic anhydride of 4 to 8 carbon atoms or a mixture of said dicarboxylic anhydrides, and (b) thereafter esterifying or amidating or esterifying and amidating said polymer to the extent of to 75 molar % with compounds selected from the group consisting of ($b_1$), ($b_1$') and ($b_2$), wherein ($b_1$) is a $C_1$-$C_{30}$alcohol, ($b_1$') is ammonia or a primary or secondary amine and ($b_2$) is the reaction product of (α) an unsaturated or saturated $C_1$-$C_{30}$alcohol, a $C_8$-$C_{22}$fatty acid, a $C_8$-$C_{22}$fatty amine or a $C_8$-$C_{22}$amide and (β) ethylene oxide, propylene oxide or a mixture thereof in the molar ratio of 1:2 to 1:20 of (α) to (β), and subsequently hydrolysing the anhydride groups of said polymer with an aqueous base.

2. A process according to claim 1, which comprises contacting said leather or pelts with a polymer which is obtained by (a) polymerising a monoethylenically unsaturated dicarboxylic anhydride of 4 to 8 carbon atoms or a mixture of said dicarboxylic anhydrides, and (b) thereafter esterifying or amidating or esterifying and amidating said polymer with the reaction product of (α) an unsaturated or saturated $C_1$-$C_{30}$alcohol, a $C_8$-$C_{22}$fatty acid, a $C_8$-$C_{22}$-fatty amine or a $C_8$-$C_{22}$fatty amide and (β) ethylene oxide, propylene oxide or a mixture thereof in the molar ratio 1:2 to 1:20, and subsequently hydrolysing the anhydride groups of said polymer with an aqueous base.

3. A process according to claim 1, which comprises contacting said leather or pelts with an effective amount of a polymer in which the degree of esterification is 5 to 40% molar, based on the amount of dicarboxylic anhydride.

4. A process according to claim 1, wherein the unsaturated dicarboxylic anhydride is selected from the group consisting of maleic anhydride, citraconic anhydride, methylenemalonic anhydride and mixtures thereof.

5. A process according to claim 4 to, wherein the dicarboxylic anhydride is maleic anhydride.

6. A process according to claim 1, wherein the $C_1$-$C_{30}$alcohol is a mixture of cetyl alcohol and oleyl alcohol.

7. A process according to claim 1, wherein the amine used for the amidation is selected from the group consisting of mono- or di-$C_1$-$C_5$alkylamines, phenyl-$C_1$-$C_5$alkylamines, mono- or di-$C_5$-$C_7$cycloalkylamines and morpholine.

8. A process according to claim 1, wherein component (α) is a $C_8$-$C_{22}$fatty acid.

9. A process according to claim 1, wherein the leather or pelts are contacted with an effective amount of the polymer from the aqueous liquor at a pH range from 4 to 10.

10. A process according to claim 1, which comprises contacting said leather or pelts with said polymer in which the degree of esterification is 25 to 35% molar, based on the amount of dicarboxylic anhydride.

11. Leather or pelts treated the process as claimed in claim 1.

12. An aqueous formulation for treating tanned leather or pelts, which is obtained by (a) polymerising a monoethylenically unsaturated dicarboxylic anhydride of 4 to 8 carbon atoms or a mixture of said dicarboxylic anhydrides, and (b) thereafter esterifying or esterifying and amidating said polymer to the extent of 5 to 75 molar % with compounds selected from the group consisting of ($b_1$), ($b_1$') and ($b_2$), wherein ($b_1$) is a $C_1$-$C_{30}$alcohol, ($b_1$') is ammonia, a mono- or di-$C_1$-$C_5$alkylamine, a phenyl-$C_1$-$C_5$alkylamine, a mono- or di-$C_5$-$C_7$cycloalkylamine or morpholine and ($b_2$) is the reaction product of (α) an unsaturated or saturated $C_1$-$C_{30}$ alcohol, a $C_8$-$C_{22}$fatty acid, a $C_8$-$C_{22}$fatty amine or a $C_8$-$C_{22}$fatty amide and (β) ethylene oxide, propylene oxide or a mixture thereof in the molar ratio of 1:2 to 1:20 of (α) to (β), and subsequently hydrolysing the anhydride groups of said polymer with an aqueous base.

13. An aqueous formulation according to claim 12, which is obtained by (a) polymerising a monoethylenically unsaturated dicarboxylic anhydride of 4 to 8 carbon atoms or a mixture of said dicarboxylic anhydrides, and (b) thereafter esterifying or esterifying and amidating said polymer to the extent of 5 to 75 molar % with the reaction product of (α) an unsaturated or saturated $C_1$-$C_{30}$alcohol, a $C_8$-$C_{22}$fatty acid, a $C_8$-$C_{22}$-fatty amine or a $C_8$-$C_{22}$fatty amide and (β) ethylene oxide, propylene oxide or a mixture thereof in the molar ratio 1:2 to 1:20 of (α) to (β), and subsequently hydrolysing the anhydride groups of said polymer with an aqueous base.

14. A process for the preparation of an aqueous solution as claimed in claim 12, which comprises initiating the polymerisation of a monoethylenically unsaturated dicarboxylic anhydride with a polymerisation initiator which is added in an amount of 5 to 40%, based on the weight of the dicarboxylic anhydride, and subsequently carrying out an esterification such that 5 to 75% of the carboxyl groups are esterified.

15. A polymer which is obtained by (a) polymerising a monoethylenically unsaturated dicarboxylic anhydride of 4 to 8 carbon atoms or a mixture of said dicarboxylic anhydrides, and (b) thereafter esterifying or esterifying and amidating said polymer to the extent of 5 to 75 molar % with compounds selected from the group consisting of ($b_1$') and ($b_2$), wherein ($b_1$') is ammonia, a mono- or di-$C_1$-$C_5$alkylamine, a phenyl-$C_1$-$C_5$alkylamine, mono- or di$C_5$-$C_7$cycloalkylamine or morpholine and ($b_2$) is the reaction product of (α) an unsaturated or saturated $C_1$-$C_{30}$alcohol, a $C_8$-$C_{22}$fatty acid, a $C_8$-$C_{22}$fatty amine or a $C_8$-$C_{22}$fatty amide and (β) ethylene oxide, propylene oxide or a mixture thereof in the molar ratio of 1:2 to 1:20 of (α) to (β), and subsequently hydrolysing the anhydride groups of said polymer with an aqueous base.

* * * * *